United States Patent
McIntyre et al.

(10) Patent No.: US 10,778,261 B2
(45) Date of Patent: Sep. 15, 2020

(54) ELECTRONIC DEVICE INCLUDING RADIO FREQUENCY (RF) FILTER MODULE WITH STACKED COAXIAL RESONATORS AND RELATED METHODS

(71) Applicant: Harris Corporation, Melbourne, FL (US)

(72) Inventors: John R. McIntyre, Rochester, NY (US); John P. Shoots, Palmyra, NY (US)

(73) Assignee: HARRIS CORPORATION, Melbourne, FL (US)

( * ) Notice: Subject to any disclaimer, the term of this patent is extended or adjusted under 35 U.S.C. 154(b) by 152 days.

(21) Appl. No.: 15/622,473

(22) Filed: Jun. 14, 2017

(65) Prior Publication Data

US 2018/0367170 A1    Dec. 20, 2018

(51) Int. Cl.
| | |
|---|---|
| *H04B 1/00* | (2006.01) |
| *H01P 1/205* | (2006.01) |
| *H01P 1/213* | (2006.01) |
| *H01P 5/12* | (2006.01) |

(52) U.S. Cl.
CPC ......... *H04B 1/0057* (2013.01); *H01P 1/2056* (2013.01); *H01P 1/2133* (2013.01); *H01P 5/12* (2013.01)

(58) Field of Classification Search
None
See application file for complete search history.

(56) References Cited

U.S. PATENT DOCUMENTS

| | | | |
|---|---|---|---|
| 5,130,683 A | 7/1992 | Agahi-Kesheh et al. | |
| 5,345,202 A * | 9/1994 | Kobayashi | H01P 1/2053 333/206 |
| 5,563,561 A | 10/1996 | Ishihara et al. | |
| 5,952,897 A * | 9/1999 | Ogura | H01P 1/2136 333/134 |
| 6,147,571 A | 11/2000 | Kitazawa et al. | |
| 6,188,299 B1 * | 2/2001 | Kawase | H01P 1/2056 29/840 |

(Continued)

FOREIGN PATENT DOCUMENTS

EP    0401839    12/1990

OTHER PUBLICATIONS

TDK Products & Technologies "Multilayer diplexers for WLAN and Bluetooth in smartphones Mini filters for multiband devices" Nov. 2014; pp. 4.

(Continued)

*Primary Examiner* — Noel R Beharry
*Assistant Examiner* — Rodrick Mak
(74) *Attorney, Agent, or Firm* — Allen, Dyer, Doppelt + Gilchrist, P.A.

(57) ABSTRACT

An electronic device may include a housing, a first printed circuit board (PCB) carried by the housing and radio frequency (RF) circuitry on the PCB, and an RF filter module carried by the PCB. The RF filter module may include a second PCB carried by the first PCB, a plurality of first coaxial resonators arranged in side-by-side relation on the second PCB, and at least one second coaxial resonator stacked on the plurality of first coaxial resonators, and interconnect circuitry coupling the plurality of first coaxial resonators and the at least one second coaxial resonator to the second PCB.

19 Claims, 6 Drawing Sheets

(56) References Cited

U.S. PATENT DOCUMENTS

| | | | |
|---|---|---|---|
| 8,340,712 B2 | 12/2012 | Rofougaran | |
| 2002/0047756 A1* | 4/2002 | Hershtig | H01P 1/2053 |
| | | | 333/134 |
| 2002/0060616 A1 | 5/2002 | Jang | |
| 2011/0104948 A1* | 5/2011 | Girard, Jr. | H01R 13/6466 |
| | | | 439/620.21 |
| 2016/0093938 A1 | 3/2016 | Darling | |
| 2018/0097505 A1* | 4/2018 | Darling | H01P 1/2053 |

OTHER PUBLICATIONS

Skyworks Data Sheet"Coaxial Resonators and Inductors (300 MHz to 6.0 GHz)" http://www.trans-techinc.com/ Apr. 10, 2013; pp. 12.
Skyworks Application Note "Coaxial Resonator Dimensions and Configurations" http://www.trans-techinc.com/ Mar. 9, 2007; pp. 3.

* cited by examiner

ELECTRONIC DEVICE INCLUDING RADIO FREQUENCY (RF) FILTER MODULE WITH STACKED COAXIAL RESONATORS AND RELATED METHODS

TECHNICAL FIELD

The present invention relates to the field of communications, and more particularly, to radio frequency (RF) communications devices and related methods.

BACKGROUND

In certain radio frequency (RF) communications devices, a diplexer is used to allow for full-duplex waveform communication. A diplexer is a passive circuit device that allows both a lower frequency signal and a higher frequency signal to coexist on a common signal port (e.g., a shared antenna port).

One example configuration in which a diplexer is used in a mobile RF device is set forth in U.S. Pat. No. 8,340,712 to Rofougaran. This patent discloses a method and system for utilizing a diplexer/duplexer for WCDMA operation as a filter for supporting GSM-based operation. A receiver portion of a wireless device may receive WCDMA signals and GSM signals via at least one duplexer or diplexer. The duplexers may enable bandpass filtering of received GSM signals. The wireless device may enable receiving the WCDMA signals and the GSM signals via a single antenna coupled to the duplexers. The receiver portion may also enable selecting a processing path for received WCDMA signals or a processing path for received GSM signals. The receiver portion may enable amplification and filtering of the WCDMA signals. Filtering of the WCDMA signals may be performed via surface acoustic wave (SAW) filters. The receiver portion may also enable filtering of the GSM signals via the duplexers and amplification of the filtered GSM signals.

Generally speaking, a relatively high Q filter may be needed in a diplexer to achieve the requisite bandwidth, selectivity, and insertion loss. In this regard, ceramic resonators are sometimes used due to their high Q, stability and repeatability. At higher frequencies (>1 GHz), the size of the ceramic resonators is relatively small. However, at lower frequencies (e.g., in the ultra high frequency (UHF) range), the size of the ceramic resonators may be relatively large compared to the overall size of a handheld radio. In either case, the requisite footprint of such diplexers (or, more generally, RF filters) may make them difficult to incorporate in a mobile form factor, and thus further enhancements in RF filter/diplexer design may be desirable in certain applications.

SUMMARY

An electronic device may include a housing, a first printed circuit board (PCB) carried by the housing and radio frequency (RF) circuitry on the first PCB, and an RF filter module carried by the PCB. The RF filter module may include a second PCB carried by the first PCB, a plurality of first coaxial resonators arranged in side-by-side relation on the second PCB, at least one second coaxial resonator stacked on the plurality of first coaxial resonators, and interconnect circuitry coupling the plurality of first coaxial resonators, and the at least one second coaxial resonator to the second PCB.

More particularly, the interconnect circuitry, the plurality of first coaxial resonators, and the at least one second coaxial resonator may be configured so that RF filter module defines a diplexer. Moreover, the plurality of first coaxial resonators may comprise four coaxial resonators, and the at least one second coaxial resonator may comprise four coaxial resonators. Additionally, the RF circuitry may comprise an RF transmitter and an RF receiver.

In accordance with one example implementation, the interconnect circuitry may include at least one capacitor or at least one inductor. Furthermore, each coaxial resonator may include an outer conductor and an inner conductor. The outer conductor of each of the plurality of first coaxial resonators may be coupled to the second PCB, and the outer conductor of the at least one second coaxial resonator may be coupled to the outer conductor of an adjacent one of the first coaxial resonators.

The interconnect circuitry, the plurality of first coaxial resonators, and the second coaxial resonator(s) may be configured so that the RF filter module defines a bandpass filter in accordance with one example embodiment. In accordance with another example embodiment, they may be configured so that the RF filter module defines a bandstop filter. In addition, the plurality of elongate coaxial resonators may comprise ceramic resonators, for example.

A related RF filter module, such as the one described briefly above, and method for making the RF filter module are also provided. The method may include arranging a plurality of first coaxial resonators in side-by-side relation on a PCB, and at least one second coaxial resonator stacked on the plurality of first coaxial resonators. The method may further include coupling the plurality of first coaxial resonators and the at least one second coaxial resonator to the PCB using interconnect circuitry.

DETAILED DESCRIPTION OF THE EMBODIMENTS

Figure 1:
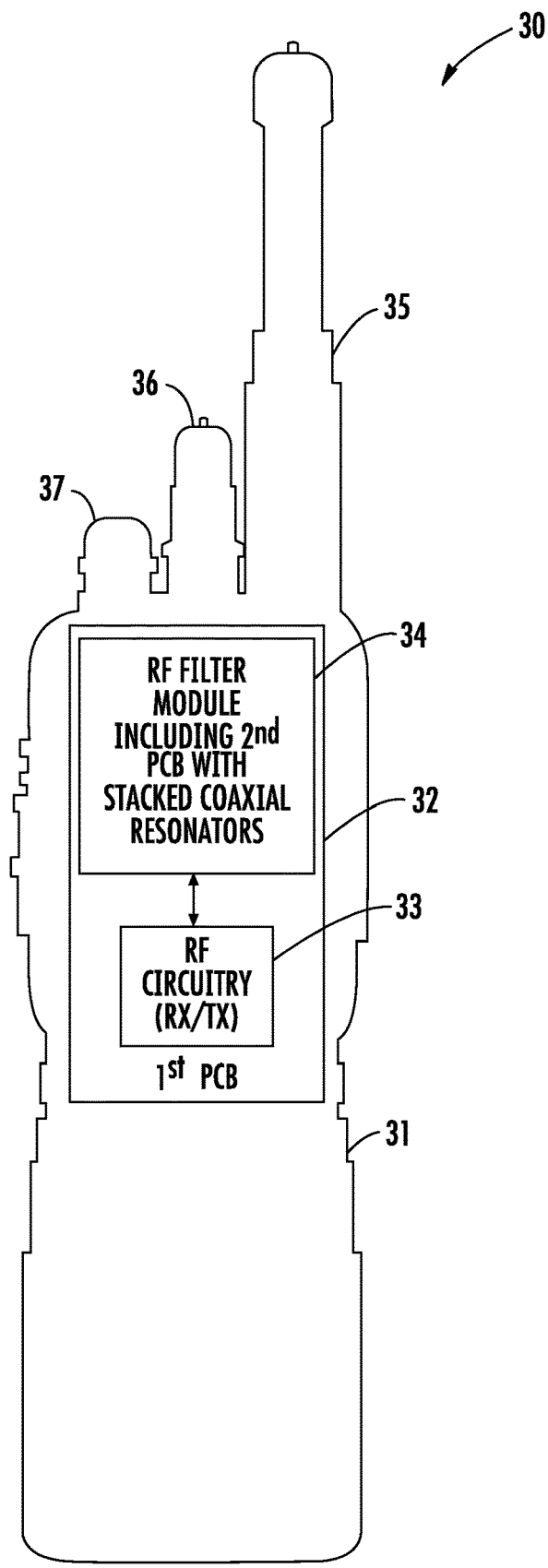
FIG. 1 is a schematic diagram of an electronic device including an RF filter module in accordance with an example embodiment.
Figure 2:
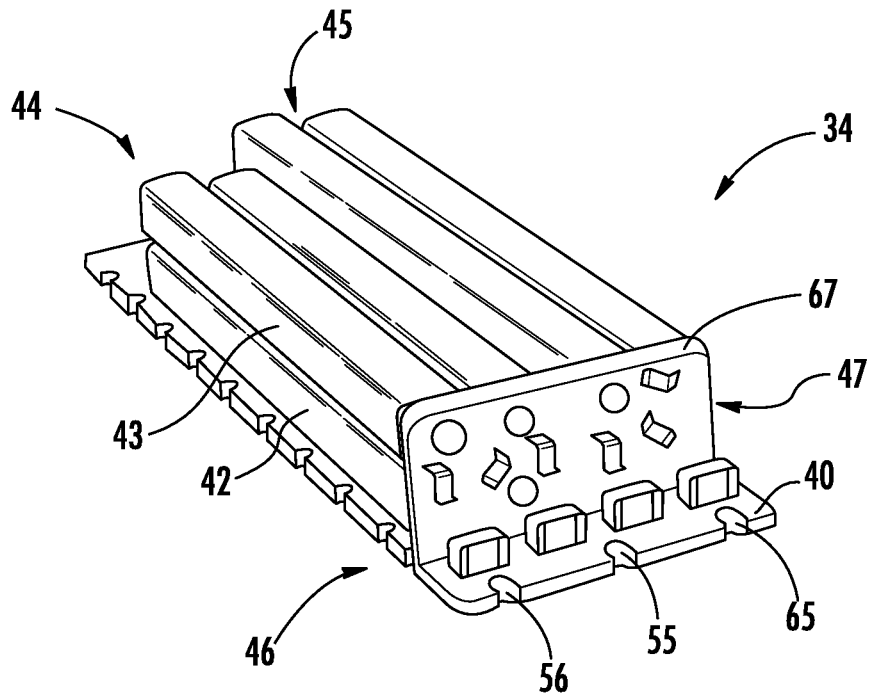
FIG. 2 is perspective view of an example RF filter module which may be used with the electronic device of FIG. 1.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Referring initially to FIGS. 1-5, an electronic device 30 illustratively includes a housing 31, a first printed circuit board (PCB) 32 carried by the housing and radio frequency (RF) circuitry 33 on the first PCB, and an RF filter module 34 carried by the first PCB. The electronic device 30 further illustratively includes first and second antennas 35, 36, and one or more control knobs 37 for adjusting volume or other operational parameters. In some embodiments, additional input control devices may be further included, such as key pads or buttons (including "soft" buttons on a digital touch screen), etc. In the illustrated example, the electronic device 30 is a handheld UHF radio, such as a Mobile User Objective System (MUOS) radio, for example, although the RF filter devices and techniques described herein may be used in other types of RF devices using other communications formats as well (e.g., VHF, cellular frequency bands, etc.).

The RF filter module 34 illustratively includes a second PCB 40 to be carried by the first PCB 32. In the example configuration shown in FIG. 5, the second PCB 40 is mounted in the area 41 on the first PCB 32, although different locations may also be used for different devices and circuit board layouts in different embodiments. The RF filter module 34 also illustratively includes a plurality of first coaxial resonators 42 arranged in side-by-side relation on the second PCB 40, and one or more second coaxial resonators 43 stacked on the plurality of first coaxial resonators. In the illustrated example, the first and second coaxial resonators 42, 43 are square coaxial ceramic resonators, such as the SR8800/9000/1000/2000 series of ceramic resonators from Skyworks Solutions, Inc. of Irvine, Calif., although other suitable resonators may also be used in different embodiments.

In the illustrated example, there are two separate spaced-apart groups of first and second coaxial resonators 42, 43 respectively defining first and second RF filters 44, 45. Each of the filters 44, 45 has two first coaxial resonators 42 on the second PCB 40, and a respective second coaxial resonator 43 stacked on each of the first resonators (i.e., a 2×2 stack). It should be noted that in other embodiments, different numbers of first and second coaxial resonators 42, 43 may be used. For example, in some embodiments a 2×1 stack may be used (i.e., two first coaxial resonators 42 on the bottom and a single second coaxial resonator 43 on top of to first coaxial resonators), or the stacks may be taller (e.g., 2×3, 2×4, etc.). Similarly, more than two of the first coaxial resonators 42 may be used on the bottom layer or row of each filter 44, 45.

Figure 3:
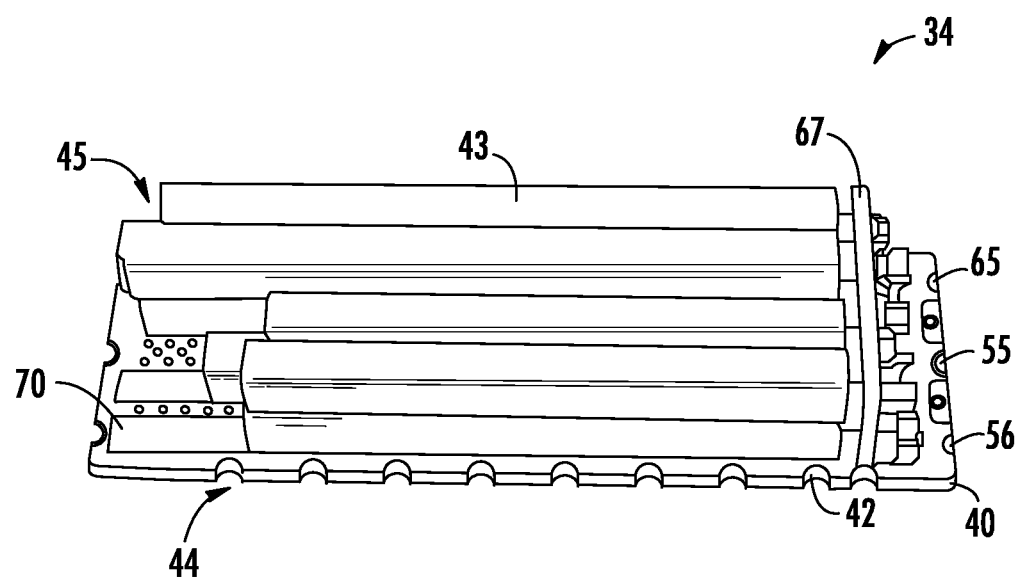
FIG. 3 is a side view of the RF filter module of FIG. 2.

As seen in FIG. 3, different lengths of the first and second resonators 42, 43 may be selected to define different operating frequencies for the first and second filters 44, 45, as will be appreciated by those skilled in the art. Other parameters of the first and second resonators 42, 43, such as the dielectric or ceramic material used, cross-sectional area, etc., may also be changed to change the operating frequencies as well.

Each coaxial resonator 42, 43 illustratively includes an outer conductor 71 and an inner conductor 72. The outer conductor 71 of each of the first coaxial resonators 43 of the first filter 44 and the second filter 45 are coupled to the second PCB 40, and more particularly to a ground plane 70 on the second PCB. Moreover, the outer conductor 71 of one or more of the second coaxial resonators 43 may be coupled to the outer conductor of an adjacent first coaxial resonator 42 and/or second coaxial resonator.

The RF module 34 further illustratively includes respective interconnect circuitry 46, 47 for each of the first and second filters 44, 45 coupling the first and second coaxial resonators 42, 43 thereof to the second PCB 40. More particularly, the interconnect circuitry 46 of the first filter 44 illustratively includes an inductor 50 and capacitors 51-54 connected in series between a common signal port 55 (e.g., which may be connected to the antenna 35 and/or 36) and a receiver port 56 located on the second PCB 40. The interconnect circuitry 46 further illustratively includes a capacitor 57 connected in parallel with the capacitors 52, 53.

Similarly, the interconnect circuitry 47 of the second filter 45 illustratively includes capacitors 60-64 connected in series between the common signal port 55 (e.g., which may be connected to the antenna 35 and/or 36) and a transmitter port 65 located on the second PCB 40. The interconnect circuitry 47 further illustratively includes a capacitor 66 connected in parallel with the capacitors 62, 63. In the example illustrated in FIGS. 2 and 3, the interconnect circuitry 46, 47 is at least partially carried on a daughter board 67 which extends vertically upward from the second PCB 40 as shown. This provides for enhanced space savings, although in other embodiments the second PCB 40 may instead have a slightly larger footprint than shown and all of the interconnect circuitry 46, 47 may instead be mounted on the second PCB, if desired.

In the illustrated configuration, the interconnect circuitry 46, 47 and the respective first and second coaxial resonators 42, 43 are configured so that first and second RF filters 44, 45 define a diplexer, and the RF circuitry 33 includes an RF transmitter and an RF receiver respectively coupled to the receiver port 56 and the transmitter port 65. However, while there are two RF filters 44, 45 shown in the illustrated diplexer example, in other embodiments the RF filter module 34 may include only a single RF filter, or more than two RF filters. Moreover, more than one RF filter module may be used in a same electronic device 30 in different embodiments. It should also be noted that in some embodiments the RF filters 44 and/or 45 need not be implemented in a modular fashion, that is, the second PCB 40 may be omitted and the remaining components mounted directly on the first PCB 33, for example.

Figure 4:
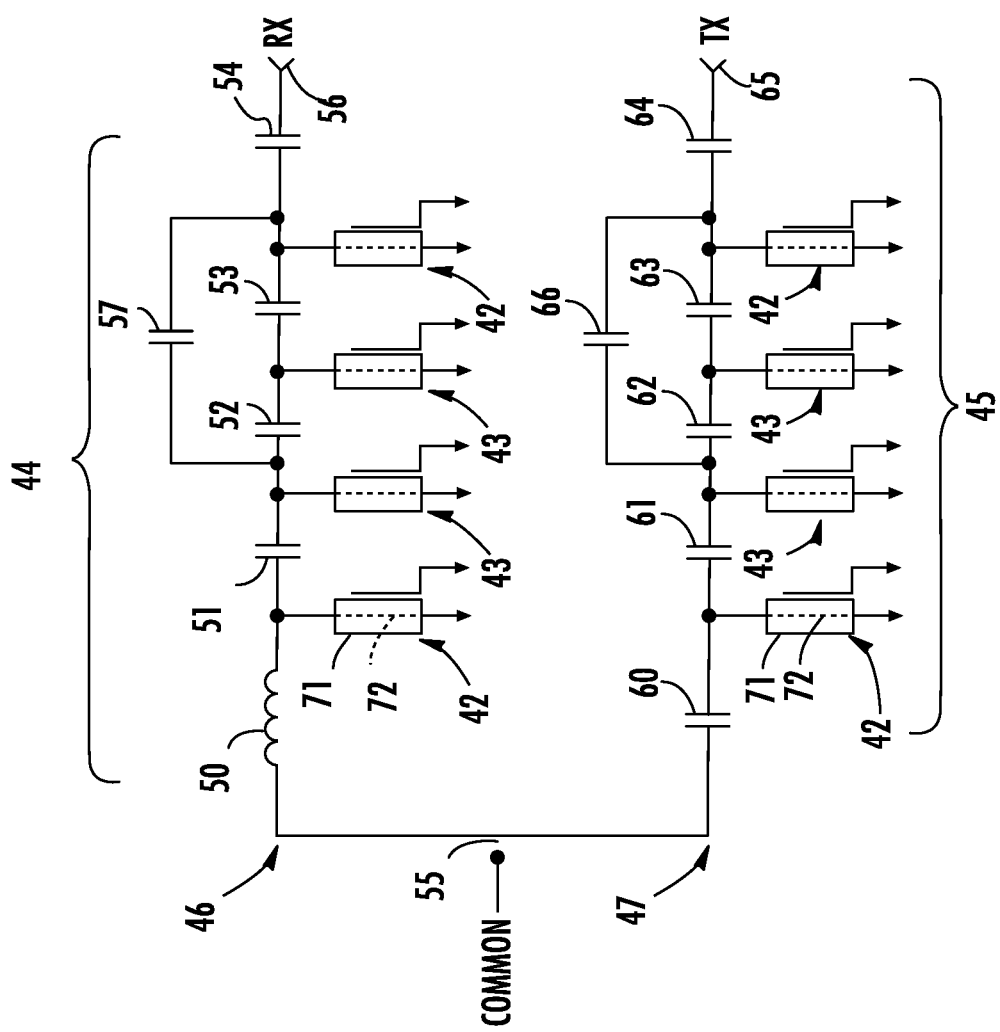
FIG. 4 is a circuit schematic corresponding to the RF filter module of FIG. 2
Figure 5:
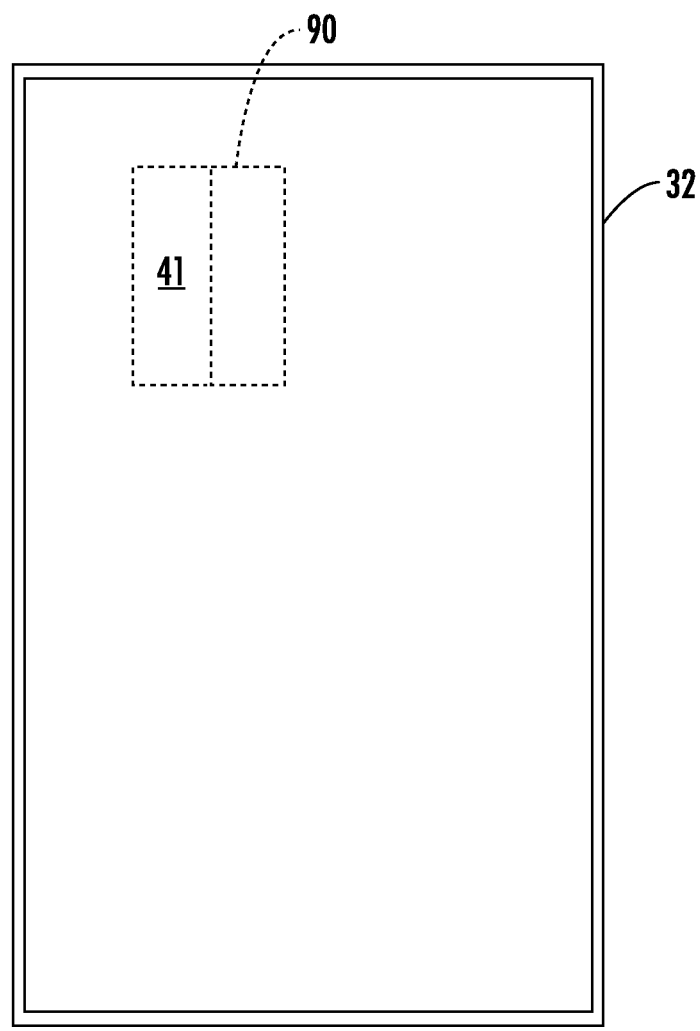
FIG. 5 is a top view of the first PCB of the electronic device of FIG. 1 in accordance with an example embodiment.
Figure 6:
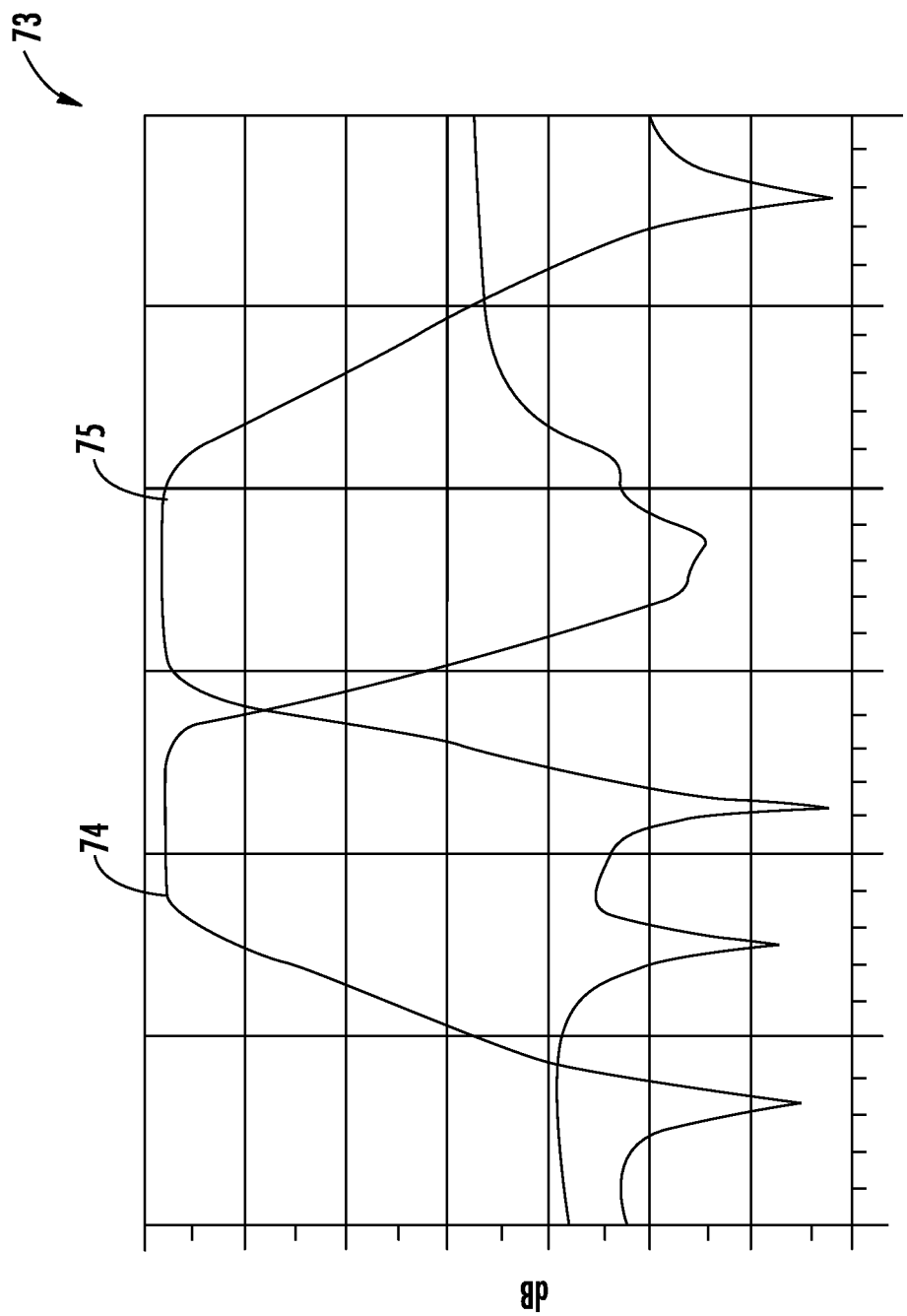
FIG. 6 is a graph of dB vs. frequency for a diplexer bandpass filter arrangement of the RF filter module of FIG. 2 in accordance with an example embodiment.

Referring additionally to the graph 73 of FIG. 6, in the example of FIG. 4 the interconnect circuitry 46, 47 and the first and second coaxial resonators 42, 43 are configured so that the first and second RF filters 44, 45 are bandpass filters having respective signal plots 74, 75. In this example, the pass bands are centered at approximately 310 MHz and 375 MHz, respectively, although they may be higher or lower in different embodiments. Moreover, in other embodiments, a bandstop filter configuration may be used, as will be appreciated by those skilled in the art.

It will accordingly be appreciated that the RF filter module 34 allows for a significantly reduced footprint (e.g., 50% or more) with respect to conventional coplanar surface-mount technology (SMT) tuned ceramic resonator diplexer devices. As such, the RF filter module 34 may advantageously be placed into a relatively small surface mount area, which is desirable for devices operating at signal frequencies which may otherwise require relatively large filter components as discussed above. Moreover, the configuration of the coaxial resonators 42, 43 and the interconnect circuitry 46, 47 advantageously provides a shorter cross-coupling path, which may in turn provide potential benefits from additional finite transmission zeros. Moreover, the RF module 34 has significant advantages over conventional filters made from lumped elements (inductors and capacitors) due to their tolerance, and because it is realizable in a smaller footprint. Indeed, a significantly larger footprint would be required on the PCB 32 (as indicated by the dashed line 90 in FIG. 5) without the above-described configurations.

Figure 7:
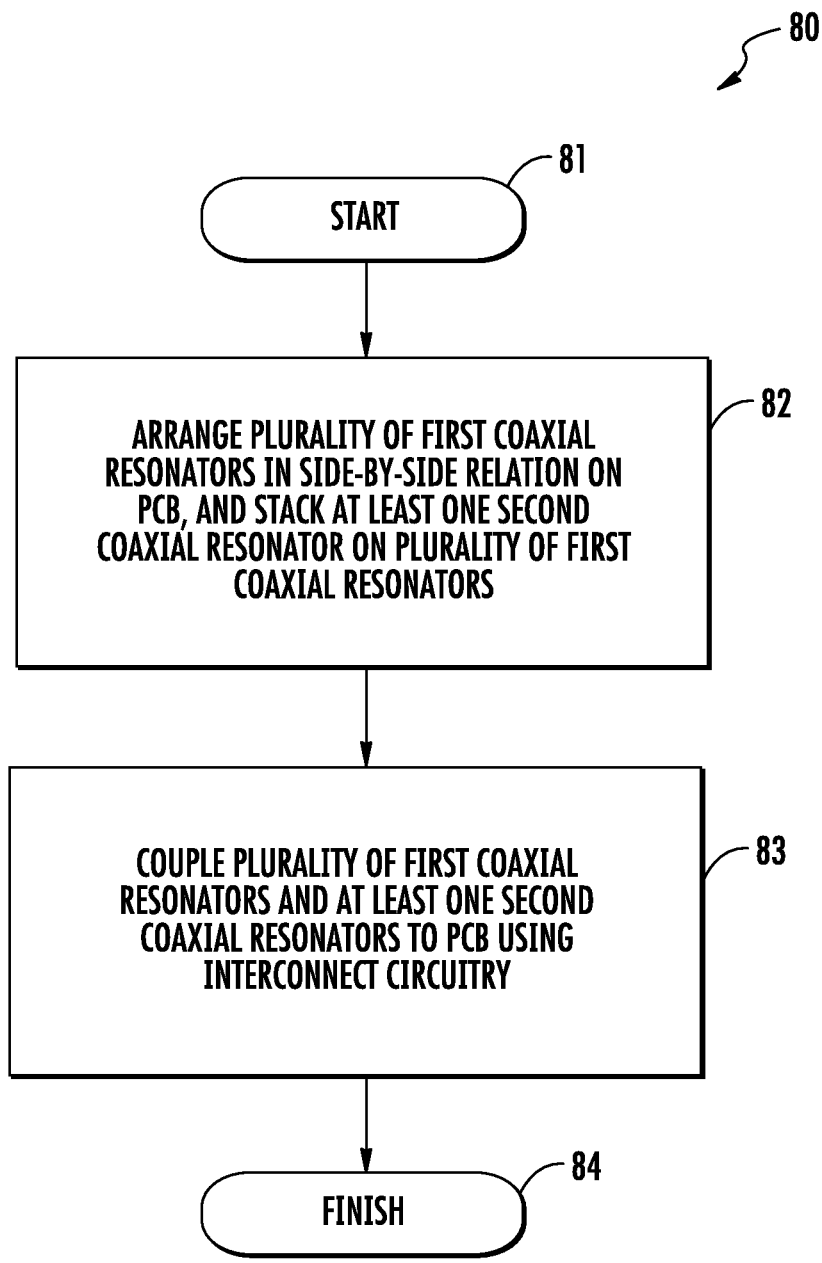
FIG. 7 is a flow diagram illustrating a method for making the RF filter module of FIG. 1 in accordance with an example embodiment.

Referring additionally to the flow diagram 80 of FIG. 7, a related method for making the RF filter module 34 are also provided. Beginning at Block 81, the method illustratively includes arranging a plurality of first coaxial resonators 42 in side-by-side relation on a PCB (e.g., the second PCB 40), and at least one second coaxial resonator 43 stacked on the plurality of first coaxial resonators, at Block 82. The method may further include coupling the plurality of first coaxial resonators 42 and the at least one second coaxial resonator 43 to the second PCB 40 using the interconnect circuitry 46, 47, at Block 83, which illustratively concludes the method of FIG. 7.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

What is claimed is:

1. An electronic device comprising:
 a housing;
 a first printed circuit board (PCB) carried by the housing;
 radio frequency (RF) circuitry on the first PCB; and
 an RF filter module carried by the first PCB comprising
  a second PCB carried by the first PCB,
  a daughter board extending vertically upward from the second PCB,
  a plurality of first coaxial resonators arranged in side-by-side relation on the second PCB so that respective ends of the first coaxial resonators are aligned along the daughter board, and at least one second coaxial resonator stacked on the plurality of first coaxial resonators so that a respective end of the at least one second coaxial resonator is aligned along the daughter board, and
  interconnect circuitry coupling the plurality of first coaxial resonators and the at least one second coaxial resonator to the second PCB, the interconnect circuitry comprising a plurality of capacitors aligned along the daughter board;
 wherein the plurality of first and second coaxial resonators are arranged in first and second spaced-apart groups each defining a respective filter, at least some of the first and second coaxial resonators in each of the first and second group having different lengths from one another, and wherein the first and second coaxial resonators in the first group are longer than the first and second resonators in the second group to define different operating frequencies for the filters; and
 wherein the interconnect circuitry, the plurality of first coaxial resonators, and the at least one second coaxial resonator are configured so that the RF filter module defines a diplexer.

2. The electronic device of claim 1 wherein the plurality of first coaxial resonators comprises four coaxial resonators; and wherein the at least one second coaxial resonator comprises four coaxial resonators.

3. The electronic device of claim 1 wherein the RF circuitry comprises an RF transmitter and an RF receiver.

4. The electronic device of claim 1 wherein the interconnect circuitry comprises at least one inductor.

5. The electronic device of claim 1 wherein each coaxial resonator comprises an outer conductor and an inner conductor; wherein the outer conductor of each of the plurality of first coaxial resonators is coupled to the second PCB; and wherein the outer conductor of the at least one second coaxial resonator is coupled to the outer conductor of an adjacent one of the first coaxial resonators.

6. The electronic device of claim 1 wherein the interconnect circuitry, the plurality of first coaxial resonators, and the at least one second coaxial resonator are configured so that the RF filter module defines a bandpass filter.

7. The electronic device of claim 1 wherein the interconnect circuitry, the plurality of first coaxial resonators, and the at least one second coaxial resonator are configured so that the RF filter module defines a bandstop filter.

8. The electronic device of claim 1 wherein the plurality of elongate coaxial resonators comprise ceramic resonators.

9. An RF filter module for use with a first printed circuit board (PCB) having radio frequency (RF) circuitry thereon, the RF filter module comprising:
 a second PCB to be carried by the first PCB;
 a daughter board extending vertically upward from the second PCB;
 a plurality of first coaxial resonators arranged in side-by-side relation on the second PCB so that respective ends of the first coaxial resonators are aligned along the daughter board, and at least one second coaxial resonator stacked on the plurality of first coaxial resonators so that a respective end of the at least one second coaxial resonator is aligned along the daughter board; and
 interconnect circuitry coupling the plurality of first coaxial resonators and the at least one second coaxial resonator to the second PCB, the interconnect circuitry comprising a plurality of capacitors aligned along the daughter board;
 wherein the plurality of first and second coaxial resonators are arranged in first and second spaced-apart groups each defining a respective filter, at least some of the first and second coaxial resonators in each of the first and second group having different lengths from one another, and wherein the first and second coaxial resonators in the first group are longer than the first and second resonators in the second group to define different operating frequencies for the filters; and
 wherein the interconnect circuitry, the plurality of first coaxial resonators, and the at least one second coaxial resonator are configured so that the RF filter module defines a diplexer.

10. The RF filter module of claim 9 wherein the plurality of first coaxial resonators comprises four coaxial resonators; and wherein the at least one second coaxial resonator comprises four coaxial resonators.

11. The RF filter module of claim 9 wherein the RF circuitry comprises an RF transmitter and an RF receiver.

12. The RF filter module of claim 9 wherein the interconnect circuitry comprises at least one inductor.

13. The RF filter module of claim 9 wherein each coaxial resonator comprises an outer conductor and an inner conductor; wherein the outer conductor of each of the plurality of first coaxial resonators is coupled to the second PCB; and wherein the outer conductor of the at least one second coaxial resonator is coupled to the outer conductor of an adjacent one of the first coaxial resonators.

14. An RF filter comprising:
 a PCB;
 a daughter board extending vertically upward from the PCB;

a plurality of first coaxial resonators arranged in side-by-side relation on the PCB so that respective ends of the first coaxial resonators are aligned along the daughter board, and at least one second coaxial resonator stacked on the plurality of first coaxial resonators so that a respective end of the at least one second coaxial resonator is aligned along the daughter board; and interconnect circuitry coupling the plurality of first coaxial resonators and the at least one second coaxial resonator to the PCB, the interconnect circuitry comprising a plurality of capacitors aligned along the daughter board;

wherein the plurality of first and second coaxial resonators are arranged in first and second spaced-apart groups each defining a respective filter, at least some of the first and second coaxial resonators in each of the first and second group having different lengths from one another, and wherein the first and second coaxial resonators in the first group are longer than the first and second resonators in the second group to define different operating frequencies for the filters; and wherein the interconnect circuitry, the plurality of first coaxial resonators, and the at least one second coaxial resonator are configured so that the RF filter module defines a diplexer.

15. The RF filter of claim 14 wherein the plurality of first coaxial resonators comprises four coaxial resonators; and wherein the at least one second coaxial resonator comprises four coaxial resonators.

16. A method for making an RF filter module comprising:
arranging a plurality of first coaxial resonators in side-by-side relation on a PCB so that respective ends of the first coaxial resonators are aligned along a daughter board extending vertically upward from the PCB, and stacking at least one second coaxial resonator on the plurality of first coaxial resonators so that a respective end of the at least one second coaxial resonator is aligned along the daughter board; and coupling the plurality of first coaxial resonators, and the at least one second coaxial resonator to the PCB using interconnect circuitry, the interconnect circuitry comprising a plurality of capacitors aligned along the daughter board;

wherein the plurality of first and second coaxial resonators are arranged in first and second spaced-apart groups each defining a respective filter, at least some of the first and second coaxial resonators in each of the first and second group having different lengths from one another, and wherein the first and second coaxial resonators in the first group are longer than the first and second resonators in the second group to define different operating frequencies for the filters; and wherein the interconnect circuitry, the plurality of first coaxial resonators, and the at least one second coaxial resonator are configured so that the RF filter module defines a diplexer.

17. The method of claim 16 wherein the plurality of first coaxial resonators comprises four coaxial resonators; and wherein the at least one second coaxial resonator comprises four coaxial resonators.

18. The method of claim 16 wherein the interconnect circuitry comprises at least one inductor.

19. The method of claim 16 wherein each coaxial resonator comprises an outer conductor and an inner conductor; wherein the outer conductor of each of the plurality of first coaxial resonators is coupled to the second PCB; and wherein the outer conductor of the at least one second coaxial resonator is coupled to the outer conductor of an adjacent one of the first coaxial resonators.

* * * * *